United States Patent Office 3,793,262
Patented Feb. 19, 1974

3,793,262
ALTERNATING COPOLYMERS OF ETHYLENE/ ALKYL ACRYLATES AND A PROCESS FOR THEIR PREPARATION
Anestis Leonidas Logothetis, Louisville, Ky., assignor to E. I. du Pont de Nemours and Company, Wilmington, Del.
No Drawing. Continuation-in-part of abandoned application Ser. No. 132,178, Apr. 7, 1971. This application Feb. 29, 1972, Ser. No. 230,483
Int. Cl. C08f 1/72
U.S. Cl. 260—86.7   9 Claims

ABSTRACT OF THE DISCLOSURE

A substantially linear alternating copolymer having a glass transition temperature lower than about 0° C. and an inherent viscosity of about 1 to about 6 (measured on a 0.1 weight percent solution in chloroform at 30° C.), said copolymer consisting essentially of about 50 mole percent of units derived from at least one alkyl acrylate said alkyl having 2 to 8 carbon atoms, the balance being ethylene units. A process for the preparation of these copolymers which consists essentially of reacting monomers in the presence of boron trifluoride and a free radical initiator. The copolymers are particularly useful as elastomers.

CROSS-REFERENCE TO RELATED APPLICATION

This application is a continuation-in-part of application Ser. No. 132,178, filed Apr. 7, 1971, now abandoned.

BACKGROUND OF THE INVENTION

This invention relates to copolymers of ethylene and alkyl acrylates and a process for their preparation. More particularly, this invention is concerned with copolymers of ethylene and alkyl acrylates wherein the alkyl contains 2 to 8 carbon atoms, and a process for the preparation for these copolymers.

Polymers of ethylene are well known in the art, and have found valuable use as elastomers. However, the known elastomeric ethylene polymers have not proven entirely satisfactory because of their low resistance to hydrocarbon oils and oxidation.

Although it is known that homopolymers of alkyl acrylate monomer units possess good resistance to oils and oxidation, their low temperature properties are unsatisfactory for some applications. Ethylene copolymers containing up to 40 weight percent alkyl acrylate units are also known. However, such copolymers generally do not provide substantial improvement in oil resistance over ethylene/α-olefin copolymers.

Thus, there has been a need for an ethylene copolymer having improved low temperature properties and resistance to oils and oxidation.

SUMMARY OF THE INVENTION

This invention provides an amorphous substantially linear alternating copolymer having a glass transition temperature lower than about 0° C. and an inherent viscosity of about 1 to about 6 (measured on a 0.1 weight percent solution in chloroform at 30° C.), said copolymer consisting essentially of about 50 mole percent of units derived from at least one alkyl acrylate said alkyl having 2 to 8 carbon atoms, the balance being ethylene units.

This invention also provides a process for preparing an amorphous substantially linear atactic alternating copolymer having a glass transition temperature less than about 0° C. and an inherent viscosity of about 1 to about 6 (measured on a 0.1 weight percent solution in chloroform at 30° C.). The process consists essentially of reacting in solution in an inert solvent about 1 to about 20 mole percent based on moles of solvent of at least one alkyl acrylate, said alkyl group having 2 to 8 carbon atoms, with ethylene at a temperature of about −10° C. to about 200° C., and in the presence of boron trifluoride at pressures sufficient to keep alkyl acrylate complexed with boron trifluoride, and about 0.05 to about 5.0 parts for every hundred parts by weight of alkyl acrylate of a free-radical polymerization initiator. The copolymer formed is isolated from the resulting reaction mass.

DETAILED DESCRIPTION OF THE INVENTION

It has been found that the alternating copolymers of this invention have outstanding resistance to oils. The copolymers of this invention also demonstrate excellent resistance to thermal and oxidative degradation, and are particularly useful as elastomers.

As used herein, the term "consisting essentially of" has its generally accepted meaning as requiring that specified components be present, but not excluding unspecified components which do not materially detract from the basic and novel characteristics of the composition or process as disclosed.

A definition of an elastomer which is applicable to the materials described herein is that of ASTM Special Technical Publication No. 184. An elastomer is "a substance that can be stretched at room temperature to at least twice its original length and, having been stretched and stress removed, returns with force to approximately its original length in a short time." It will be understood that the copolymers are useful as elastomers after the copolymers are cured.

The copolymers of this invention consist essentially of ethylene units, and units derived from an alkyl acrylate wherein the alkyl group is a hydrocarbon group having 2 to 8 carbon atoms, and especially alkyl acrylates wherein the alkyl group has 2 to 4 carbons atoms. Typical of the alkyl acrylates useful in this invention are ethyl acrylate, butyl acrylate, and octyl acrylate, and mixtures thereof. The preferred alkyl acrylates are ethyl acrylate and butyl acrylate, and mixtures thereof.

A unique aspect of the copolymers of this invention is that the copolymers are alternating copolymers, i.e., they exhibit the structure $(E-A)_n$ where E represents an ethylene unit, An alkyl acrylate unit, and $n$ is a whole number. There is a practical absence of polyethylene units or polyalkyl acrylate units.

The copolymers of this invention have a glass transition temperature less than about 0° C. This makes the copolymers particularly useful as elastomers. Glass transition temperature for a given copolymer can be determined by methods well known in the art. A typical procedure is described in the examples. Preferred copolymers are a copolymer of ethylene and ethyl acrylate having a glass transition temperature below about −35° C., and a copolymer of ethylene and butyl acrylate having a glass transition temperature below about −55° C.

The copolymers of the present invention consist essentially of practically all linear chains or "backbones." These copolymers exhibit properties substantially the same as known linear copolymers as evidenced by N.M.R. spectra. Also, the copolymers of this invention have been found to be amorphous and possess practically no stereoregularity.

The copolymers of this invention when used to prepare elastomeric products can be processed with conventional rubber processing equipment in the same way as alphaolefin based elastomers, particularly those elastomers having broad molecular weight distribution. Typical of the rubber processing equipment used are roll mills, and internal mixers (such as Banbury mixers). Mixer loading, operating time and speeds, etc. will be obvious to those skilled in the art.

When the copolymers of this invention are blended with rubbers or other polymers, conventional compounding ingredients, such as carbon black, mineral fillers such as clay, coloring agents, extending oils and the like can be incorporated into the elastomeric composition. Preferably, no ingredients should be added which should reduce the resistance to oxidation, oil or thermal degradation.

Heretofore, there was no known process for preparing the alternating copolymers of this invention. Details of a novel process are described below.

The novel process of this invention consists essentially of reacting ethylene and one or more of the alkyl acrylates previously mentioned with a Lewis acid and a free-radical polymerization initiator in an inert solvent.

By inert solvent is meant that the solvent does not react with the reactants or with the product formed. The solvent must also be capable of dissolving the reactants and the copolymer formed. Typical of suitable solvents are dichloromethane, chloroform, dichloroethane, benzene, toluene, and chlorobenzene. Dichloromethane and dichloroethane are preferred.

A Lewis acid found to be useful in this invention is boron trifluoride. Equal, less than, or excess molar amounts of the Lewis acid with respect to the alkyl acrylate can be used. Less than an equimolar amount of the Lewis acid with respect to the alkyl acrylate should preferably be avoided because the rate of polymerization decreases. It is preferred to use about an equimolar amount of the Lewis acid.

The number of moles of ethylene used in the polymerization process should be about equal to or greater than the moles of alkyl acrylate, preferably, about a 2–15 fold molar excess. The amount of ethylene present during polymerization is dependent on the pressure.

The amount of the alkyl acrylate present during the polymerization reaction is about 1 to about 20 moles percent based on moles of the solvent, preferably about 10 to about 15 mole percent.

The polymerization reaction is also conducted in the presence of a free-radical polymerization initiator well known in the art, such as an azo-initiator or an organic peroxide. The most effective free-radical polymerization initiators can be determined by a minimum amount of experimentation. Preferred initiators are benzoyl peroxide, azo-bisisobutyronitrile and 2,2'-azobis(2-methylpropionitrile). The amount of the initiator is about 0.05 to about 5.0 parts for every 100 parts by weight of the alkyl acrylate. The amount of the initiator is preferably about 0.1 to about 1.0 part by weight. The initiator can be added to the reaction mass at the start of the reaction, or gradually as the reaction progresses. It is conveniently dissolved in the inert solvent before addition to the reactor.

The reaction can be carried out at —10 to 200° C. Preferably, the reaction is conducted at about 0° C. to about 100° C., and most preferably about 25° C. to about 50° C. Pressure maintained during the reaction is sufficient to keep alkyl acrylate complexed with boron trifluoride. Generally, pressure during the reaction are about 10 p.s.i.g. to about 10,000, preferably 10–1000 p.s.i.g., and most preferably about 100 to 500 p.s.i.g. It can be seen that reaction time is a function of temperature. At higher temperatures, the reaction proceeds at a faster rate. For example, at 25° C. and 300 to 500 p.s.i.g. ethylene pressure a typical reaction will go substantially to completion in about 90 minutes to about 2 hours. At about 50° C., the same reaction will take only about 40 to about 60 minutes. Completion of the reaction is evidenced by a drop in reaction pressure as ethylene is consumed during the reaction. The process of this invention can be operated on a batch or continuous basis.

The apparatus to be used in practicing the novel process of this invention will be apparent to those skilled in the art and will be selected to withstand the operating temperatures and pressures. It is preferable to mix the reaction mass with agitation in order to obtain a more homogeneous product. For example, mild agitation permits the formation of a copolymer having a more uniform inherent viscosity than a similar copolymer prepared without agitation.

The atmosphere above the liquid reaction mass will be saturated with ethylene vapor. The sequence of addition of the reactants to the reaction vessel is not critical. As a practical matter, in a batch process liquids are generally added first to a reactor, the reactor is then closed, and pressurized in turn with $BF_3$ and ethylene. A continuous process can also be used in which case the components, preferably, are added simultaneously.

After termination of the reaction, copolymer can be isolated by conventional solvent removal techniques. For example, drum drying or steam stripping can be used. Boron trifluoride is also removed from the product during polymer isolation. Another method of isolating the copolymer involves precipitating the copolymer from the solution using hexane followed by washing with methanol in a blender. The novel process of this invention permits the preparation of copolymers having properties which make them useful as elastomers. Yields of 95 percent or more based on the weight of the alkyl acrylate initially in the reaction mass can be obtained by the process of this invention.

This invention is further illustrated by the following specific examples. All parts, proportions, and percentages are by weight unless otherwise indicated.

EXAMPLE 1

(A) Preparation of alternating ethyl acrylate/ ethylene copolymer

A solution of 20 grams (0.20 gram-mol) of ethyl acrylate (EA) and 0.15 gram of 2,2'-azobis [2-methylpropionitrile] in 200 milliliters of methylene chloride is saturated with 13.5 grams (0.20 gram-mol) of boron trifluoride and placed in a 400-milliliter shaker tube. After being cooled in a bath of crushed solid carbon dioxide and evacuated, the tube is pressured with 75 grams (2.7 grammols) of ethylene (E). Copolymerization is then accomplished by shaking the tube at 25° C. for 12 hours. The gases are vented, the product is removed from the shaker tube, and then steam is passed through the resutling mixture to remove volatiles, including boron trifluoride and solvent. The isolated polymer is dissolved in acetone, the resulting solution is filtered, and then precipitated from the filtrate by addition of steam, washed twice with a 50:50 methanol-water solution in a blender mixer, and dried in a vacuum oven at 80° C. The ethyl acrylate/ethylene copolymer obtained is a slightly yellow solid weighing 23.7 grams, and has an inherent viscosity of 4.43 (measured at 30° C. on a solution of 0.1 gram of copolymer in 100 milliliters of chloroform) and a glass transition temperature of —38° C. (as measured by differential scanning calorimetry).

*Analysis.*—Calcd. for EA (50 mol percent/E (50 mol percent) (percent): C, 65.60; H, 9.44; O, 24.96. Found (percent): C, 65.6; H, 9.3; O, 25.63.

A differential scanning calorimeter (prototype of the commercial Du Pont instrument) is used to measure glass transition temperature. It is a miniature oven containing 2 thermocouples. A tiny aluminum cup (0.25-inch in diameter) is seated on each of these thermocouples. The reference cup is empty, air or nitrogen being the medium. The sample cup contains a minute polymer sample (e.g., 15 mg.). Since both sample and reference are at the same temperature when the test starts, the thermocouples generate no signal, i.e., $\Delta T=0$. The starting temperature should be below the second order transition temperature, preferably 0° C. or below. During the measurement, the cups are heated, the temperature in the oven rising at the rate of 11° C./min. At the transition point, however, heat will be absorbed to effect the change of state from glassy to rubbery polymer; since the polymer temperature will be steady, ΔT will suddenly rise as the reference medium becomes warmer than the polymer. When all the glass has become rubber, the polymer will begin to warm up again, and ΔT will fall off toward zero.

For reliable comparisons of polymer samples, each should have had the same history before testing and the test details should be the same (e.g., rate of heating, sample size, etc.).

Typical useful art is the book Thermoanalytical Methods of Investigation by P. D. Garn, Academic Press, New York, 1965.

The 220 mHZ. (200 million cycles/sec.) N.M.R. spectrum indicates that the copolymer is substantially made up of alternating EA and E monomer units as follows:

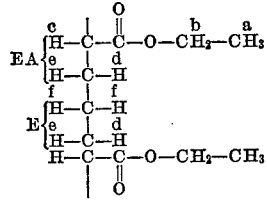

| Type of proton | Observed chemical shift (p.p.m.) | Observed area | Indicated No. of protons |
|---|---|---|---|
| a | 1.23 (triplet) | *74 | 3 (est.) |
| b | 4.10 (quartet) | 50 | 2 |
| c | 2.25 (broad singlet) | 26 | 1 |
| d | 1.53 (multiplet) | 51 | 2 |
| e | 1.38 (multiplet) | 49 | 2 |
| f | 1.23 | *48 | 2 (est.) |

* The area at 1.23 is 122; it has been apportioned as shown.

Nuclear magnetic resonance is a standard method for determining structure. It is described in detail in applications of Nuclear Magnetic resonance Spectroscopy in Organic Chemistry, by Jackman and Sternhill, Pergamon Press, New York, 2nd ed., 1969 and in Nuclear Magnetic Resonance Application to Organic Chemistry, by Roberts, McGraw-Hill Book Company, New York 1959.

The ethyl acrylate (EA)/ethylene (E) copolymer shows no peaks attributable to polyethyl acrylate sequences (2 or more EA in a row) or to polyethylene sequences, therefore the spectra further support the chemical evidence that the copolymers are alternating.

The chemical shift, a frequency shift, represented by "parts per million" which suggests a concentration. However, the reason for this convention lies in the need to report chemical shift values conveniently in a form in which they are independent of the operating frequency of the instrument. The details are as follows. The standard frequency is the one at which the nuclei of spherically arranged, isotropic protons of tetramethylsilane become resonant giving rise to a sharp, strong singlet peak in the spectrum. It is the "zero line" for the spectra reported in this example. The chemical shift for a particular proton, e.g. the $\overset{b}{H}$ proton in the EA/E dipolymer, is the frequency difference between the standard frequency and the frequency at which the nucleus of that proton is resonant. The value of the difference depends on the operating frequency of the instrument. Suppose a 220 mHz. instrument is used. Then the actual $\overset{b}{H}$ chemical shift is 902 Hz., i.e. 902 cycles/sec. If one changes to a 100 mHz. instrument, the actual $\overset{b}{H}$ chemical shift will be proportionately decreased to 410 cycles/sec. Similarly, if a 220 cycles/sec. shift is observed on a 220 mHz. machine, a 100 cycles/sec. shift will be observed on a 100 mHz. machine. In order to get measurements on a common basis, the actual chemical shift values are "normalized," that is, divided by the instrument operating frequency. Accordingly, $$\frac{902 \text{ Hz.}}{220 \text{ mHz.}} = \frac{9.02 \times 10^2 \text{ cycles/sec.}}{2.20 \times 10^2 \times 10^6 \text{ cycles/sec.}} = 4.10 \times 10^{-6}$$

$$\frac{410 \text{ Hz.}}{100 \text{ mHz.}} = \frac{4.10 \times 10^2 \text{ cycles/sec.}}{1.0 \times 10^2 \times 10^6 \text{ cycles/sec.}} = 4.10 \times 10^{-6}$$

These values are dimensionless.

Finally, the shift values are made more easy to tabulate and use by cancelling the $10^{-6}$ factor. This change is accomplished by multiplying all values by one million. The reported values, called delta values, often range from 0 to 10 p.p.m. There is another convention used by many investigators in which the reference has a value of 10 p.p.m.; the resulting tau values are equal to 10-delta.

(B) Curing the alternating ethyl acrylate/ethylene copolymer

The copolymer prepared in part (A) is compounded on a rubber roll mill in accordance with the following recipe:

| | Parts by weight |
|---|---|
| EA/E copolymer | 100 |
| FEF carbon black [1] | 50 |
| MgO | 5 |
| m-Phenylenebis (maleimide) | 2.4 |
| Dicumyl peroxide [2] | 4.0 |

[1] ASTM Type N-550.
[2] Used as a 40 wt. percent solution in petrolatum.

The stock obtained is placed in a 2.54 x 12.7-cm. [1 x 5-inch] mold and cured in a press at 166° C. under pressure [30,000 lbs. exerted by the ram] for 30 minutes. Table I gives typical vulcanizate data (measured at 25° C.).

TABLE I

Cured black loaded EA/E copolymer

| | |
|---|---|
| Tensile strength (kg./cm.²) | 144 |
| Extension at break (percent) | 210 |
| Permanent set at break (percent) | 3 |
| Shore A Hardness | 66 |
| Compression set [22 hrs. at 70° C.] (percent) | 16 |

The thermal and oxidative stability of cured E/EA alternating copolymer determined by heat aging tests is equivalent to a commercially available polyacrylate, and considerably better than a commercial nitrile rubber.

Black-loaded E/EA alternating copolymer stocks, cured by peroxide, are aged in air at 300° F. and the cure properties measured at room temperature at convenient intervals. The results are tabulated below. The results show that, at least for the period tested, the vulcanizate is unaffected.

TABLE II

Heat aging of E/EA copolymer of part A cured stock at 149° C.

| Properties | 0 hrs. | 24 hrs. | 48 hrs. | 72 hrs. | 144 hrs. |
|---|---|---|---|---|---|
| Tensile strength (kg./cm.²) | 137 | 123 | | 151 | 155 |
| Extension at break (percent) | 190 | 150 | | 190 | 180 |
| Modulus at 100% extension (kg./cm.²) | 70 | 77 | | 70 | 84 |
| Permanent set at break (percent) | 1 | 1 | | 1 | 1 |
| Compression set, percent [100° C./70 hrs.] | 30, 29 | 21, 23 | 25, 25 | 25, 25 | 25, 25 |

Recipe: 100 copolymer, 40 FEF black, 1 "Agerite" D, 4.0 "Di-cup" 40-C, 2.5 m-phenylene bismaleimide, 5.0 MgO at 320° F./30 mins. "Di-cup" 40-C is a mixture of 40 parts dicumyl peroxide and 60 parts of the petrolatum Nujol. "Agerite D" is polymerized 2,2,4-trimethyl-1,2-dihydroquinoline.

EXAMPLE 2

Preparation of alternating butyl acrylate/ethylene dipolymer

A solution of 26 grams (0.2 gram-mol) of n-butyl acrylate and 0.15 gram of 2,2'-azobis [2-methylpropionitrile] in 200 milliliters of methylene chloride is saturated with 13.6 grams (0.2 gram-mol) of boron trifluoro and introduced into a 400-milliliter shaker tube. After being cooled in a bath of crushed solid carbon dioxide and evacuated, it is pressured with 40 grams (1.4 gram-mols) of ethylene. The tube is shaken thereafter for 6 hours at 50° C.

The product, isolated by the procedure of Example 1, typically weighs 30 grams, has an inherent viscosity of 1.89 (measured as before) and a glass transition temperature of −57° C. (by differential scanning calorimetry), and contains equal molar proportions of each monomer.

*Analysis.*—Calcd. for 1:1 dipolymer (percent): C, 69.19; H, 10.32. Found (percent): C, 69.0; H, 10.1.

This copolymer can also be cured by the method described in Example 1, part (B).

I claim:

1. A process for preparing an amorphous substantially linear atactic alternating copolymer having a glass transition temperature less than about 0° C. and an inherent viscosity of about 1 to about 6 (measured on a 0.1 weight percent solution in chloroform at 30° C.), the Process consisting of reacting in solution in an inert solvent about 1 to about 20 mole percent based on moles of solvent of at least one alkyl acrylate said alkyl having 2 to 8 carbon atoms, with ethylene at a temperature of about from −10 to about 200° C. in the presence of boron trifluoride at pressures sufficient to keep alkyl acrylate complexed with boron trifluoride and about 0.05 to about 5.0 parts for every 100 parts by weight of alkyl acrylate of a free-radical polymerization initiator, and isolating copolymer formed in the resulting reaction mass.

2. The process of claim 1 wherein the alkyl acrylate is ethyl acrylate, butyl acrylate, or a mixture of ethyl acrylate and butyl acrylate.

3. The process of claim 1 wherein pressure is maintained between about 10–10,000 p.s.i.g.

4. The process of claim 1 wherein the temperature is about from 0° C. to about 100° C. and the pressure is maintained between about 10 p.s.i.g. to about 1000 p.s.i.g.

5. The process of claim 2 wherein the temperature is about 25° C. to about 50° C., and the pressure is about 100 to about 500 p.s.i.g.

6. The process of claim 5 wherein the solvent is dichloromethane, dichloroethane, chloroform, or chlorobenzene.

7. The process of claim 6 wherein the initiator is benzoyl peroxide, azo-bis-isobutyronitrile, or 2,2′-azobis(2-methylpropionitrile).

8. The process of claim 7 wherein the initiator is about 0.1 to about 1.0 part for every 100 parts by weight of the alkyl acrylate.

9. The process of claim 8 wherein the $BF_3$ is present in about 0.5 to 1.0 molar eqiuvalent to the alkyl acrylate.

References Cited

UNITED STATES PATENTS

| | | | |
|---|---|---|---|
| 3,183,217 | 5/1965 | Serniuk et al. | 260—85.5 |
| 3,278,503 | 10/1966 | Serniuk | 260—82.5 |
| 3,647,771 | 3/1972 | Nakaguchi et al. | 260—86.7 |
| 3,700,648 | 10/1972 | Hirooka et al. | 260—63 R |

FOREIGN PATENTS

| | | | |
|---|---|---|---|
| 1,123,723 | 8/1968 | Great Britain | 260—63 |

JOSEPH L. SCHOFER, Primary Examiner

J. KIGHT III, Assistant Examiner